Figure 1:
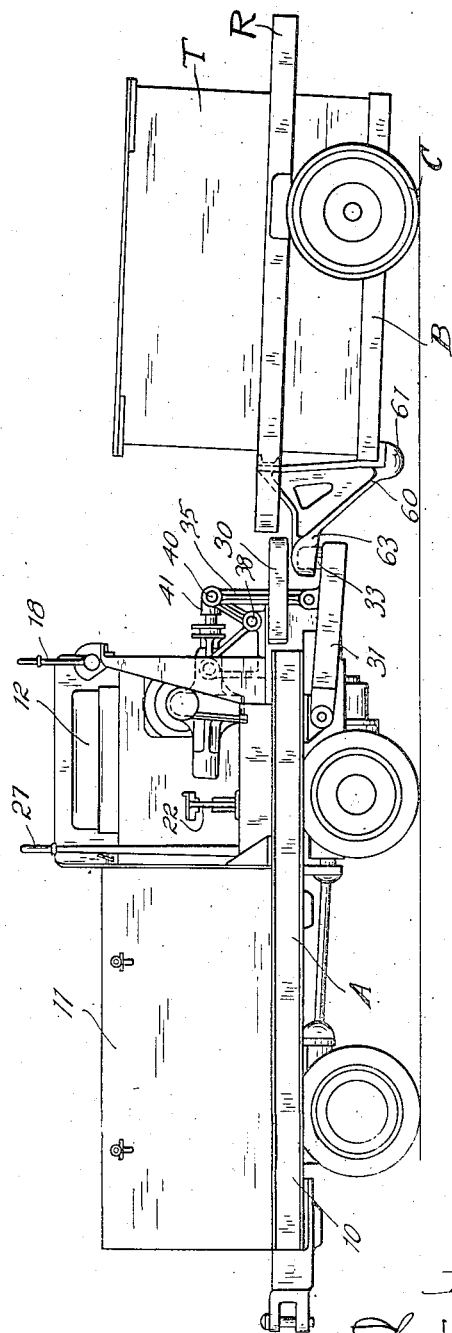

July 8, 1924.  
C. E. COCHRAN  
INDUSTRIAL TRUCK  
Filed March 24, 1921  
1,500,236  
4 Sheets-Sheet 1

July 8, 1924.

C. E. COCHRAN 1,500,236

INDUSTRIAL TRUCK

Filed March 24, 1921    4 Sheets-Sheet 2

INVENTOR
Clyde E. Cochran
By Baker & Mereklin,
ATTORNEYS

July 8, 1924.

C. E. COCHRAN

INDUSTRIAL TRUCK

Filed March 24, 1921.

1,500,236

4 Sheets-Sheet 3

INVENTOR
Clyde E. Cochran,
By Baker & Mercklein,
ATTORNEYS

July 8, 1924.

C. E. COCHRAN

INDUSTRIAL TRUCK

Filed March 24, 1921

1,500,236

4 Sheets-Sheet 4

INVENTOR
Clyde E. Cochran
By Baker & Macklin,
ATTORNEYS

Patented July 8, 1924.

1,500,236

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

Application filed March 24, 1921. Serial No. 455,252.

*To all whom it may concern:*

Be it known that I, CLYDE E. COCHRAN, a citizen of the United States, residing at Cleveland, in the county of Cuyahoga and State of Ohio, have invented a certain new and useful Improvement in Industrial Trucks, of which the following is a full, clear, and exact description, reference being had to the accompanying drawings.

This invention relates to industrial trucks and trailers of the type wherein one end of the trailer is bodily lifted when coupled to the truck to allow the trailer to travel on two wheels.

One of the objects of the invention is to provide a tractor having efficient means thereon for coupling the same to a trailer and at the same time raising the adjacent end thereof.

Another object is to provide the portion of the coupling which is on the trailer in a form which is strong and adapted to support the end of the trailer and has means for ready connection with the cooperating coupling member mentioned.

The practice heretofore when using a tractor in combination with a trailer has been to position a coupling mechanism at the rear of the truck and the operator's seat or support has been positioned on the forward end of the truck, thus the coupling mechanism is obscured from the operator's vision, consequently necessitating the loss of considerable time in maneuvering the truck into a proper coupling relation to the trailer. The operator frequently was required to leave his position on the truck to couple the trailer thereto or to use an assistant who would couple the truck to the trailer.

The general object of the present invention therefore, is the provision of such an arrangement of an operator's support on the truck with relation to the control mechanism for operating the truck and the coupling mechanism and its controlling means that the operator when in position to control the truck may readily observe the forward or coupling end of the trailer and the rearward coupling end of the tractor, whereby the operator while in his normal position may maneuver the truck in all directions without loss of time or inconvenience and without necessitating the presence of an assistant.

An important feature of the present invention is the use of power-operated coupling means which may be adapted to simultaneously raise the forward end of the trailer while effectively coupling the trailer to the tractor.

Figure 2:
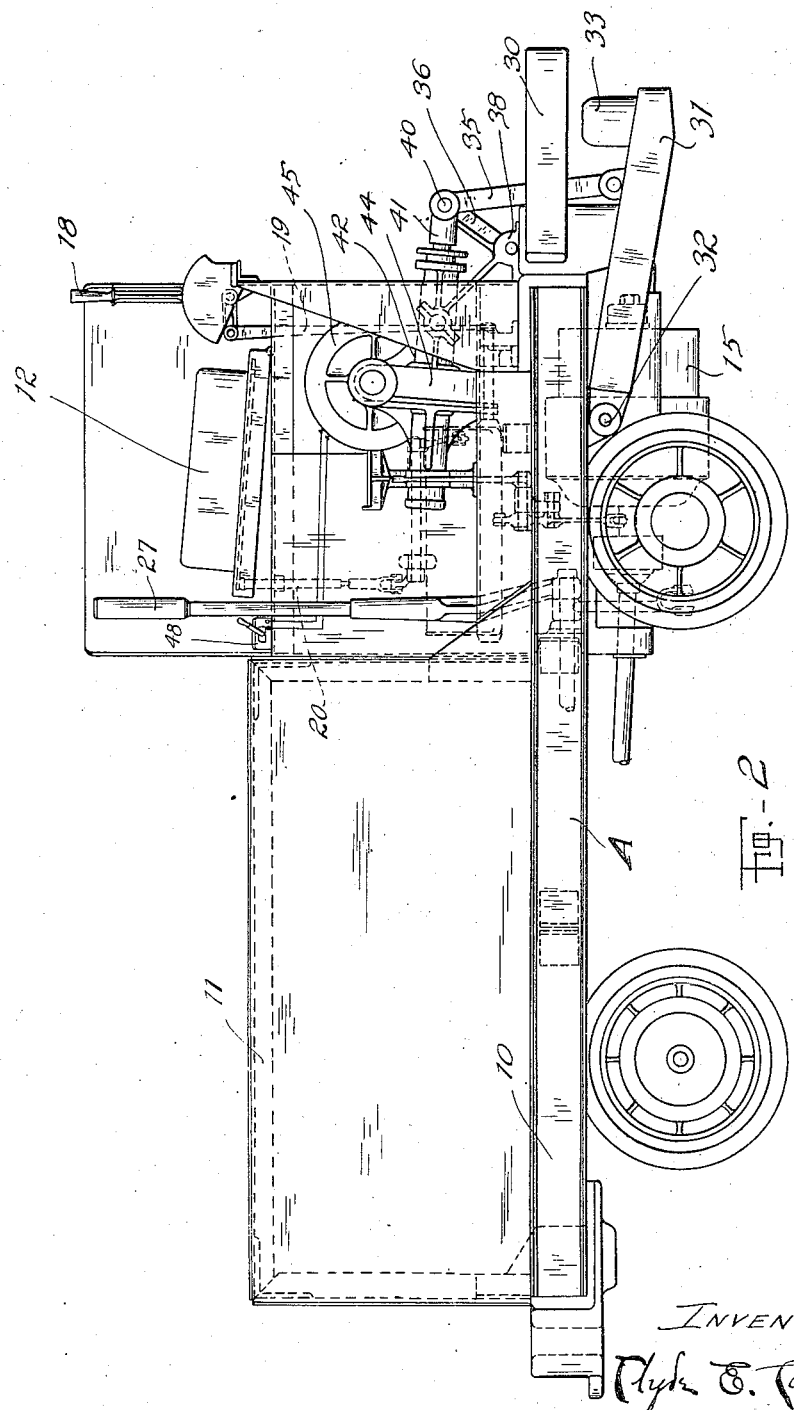
Figure 3:
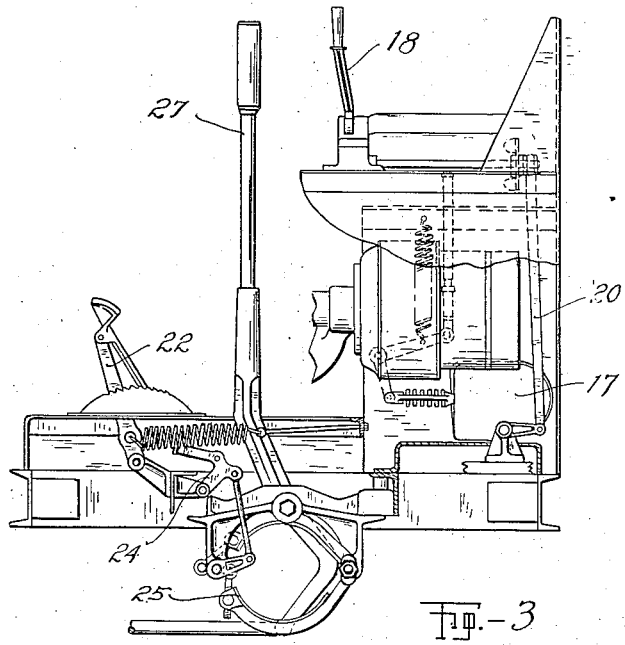
Figure 4:
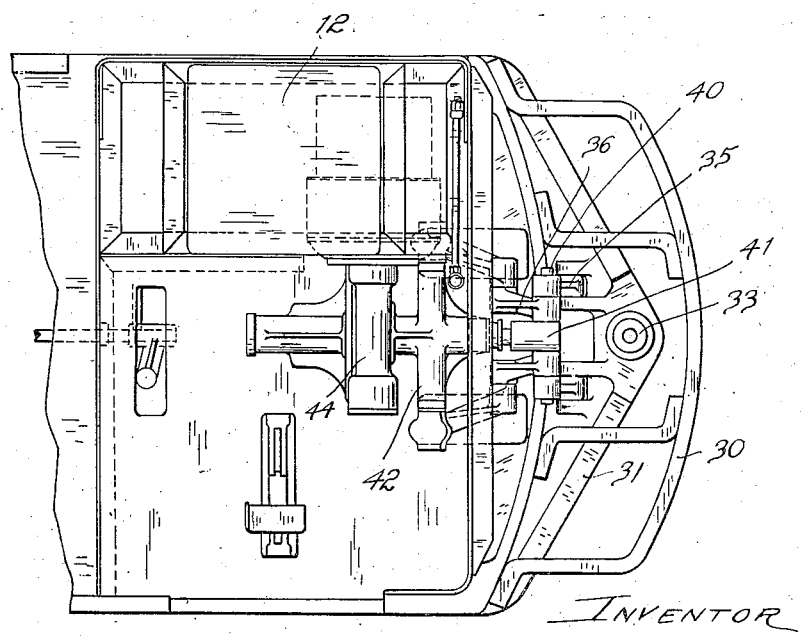
Figure 5:
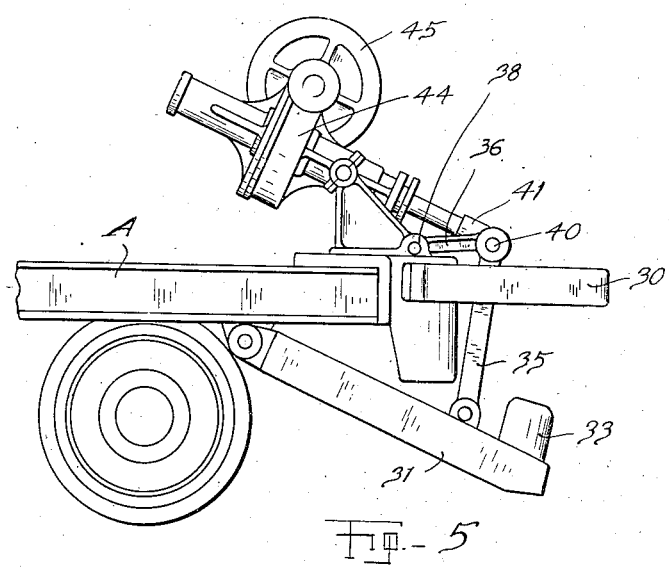
Figure 6:
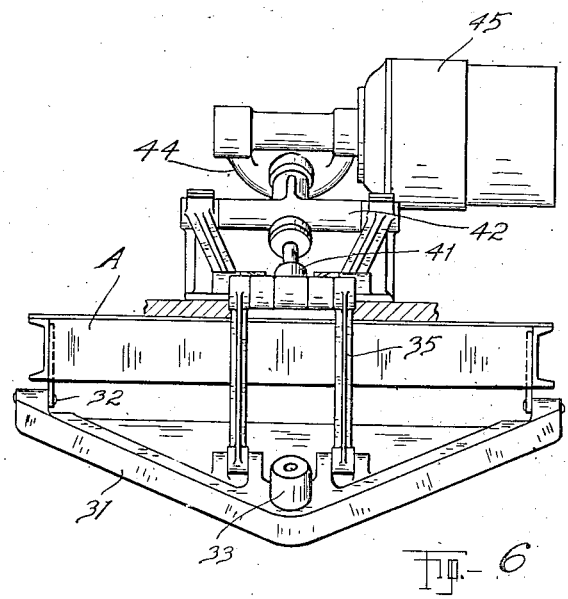

Further objects of the invention will be apparent from the following specification taken in connection with the accompanying drawings, wherein, Fig. 1 is a side elevation of my improved tractor and trailer; Fig. 2 is a view similar to Fig. 1 showing the tractor on an enlarged scale; Fig. 3 is an elevation showing the control mechanism; Fig. 4 is a top plan view of the tractor; Fig. 5 is a detail elevation showing the elevating mechanism; Fig. 6 is a front elevation of the elevated mechanism.

Referring to the drawings, I have shown at A a self propelled vehicle which may be an electrically driven industrial truck comprising the frame 10 having the battery case 11 thereon. Arranged at the forward end of the truck, I show an operator's seat 12. The truck may be driven by means of a motor 45, which is operated through a controller box 17. The controller may be actuated by the operator's handle 18, through suitable linkage 19, as shown.

The arrangement of the controls, the driver's seat or like support and position of these with relation to the coupling mechanism is such that the driver may sit or stand facing sideways of the truck with control members in his hand and a brake or other control operable by the foot without his changing position. This also permits watching the coupling operation and without shifting his position or without letting go of the controls, may look without discomfort either forwardly or rearwardly.

I have shown the operator's seat as provided with a safety device, including links 20 which serve to open the circuit to the battery whenever the operator leaves his seat. A suitable brake device is shown at 22, which includes the usual foot pedal and connecting mechanism 24, to operate the external contracting brake 25. The direction of the truck is controlled by the steering handle 27.

Adjacent the forward portion of the truck, I have shown a bumper 30, and beneath the bumper a pivoted coupling member 31. This coupling is shown as pivoted at 32 to the truck frame and has at its forward end a coupling projection 33.

Attached intermediate the coupling projection and the pivot point 32, I provide the lever 35, which has pivoted at its end, a second lever 36. This lever 36 is shown as pivoted to the bracket 38, carried on the truck frame. It will be seen that these two levers 35 and 36, constitute a toggle, and that the backward and forward movement of the pivot 40 of the toggle produces an up and down motion of the coupling 31. The construction of the bumper and its relation to the coupling projection 33 is such that the latter may be visible from the operator's position on the truck.

In order to provide such backward and forward movement of the toggle, I have provided a pull-rod 41, connected to the pivot of the toggle. This rod is shown as comprising an encased screw 42, the screw being adapted to be driven by a nut within the casing 44. This nut may carry teeth upon its exterior surface to thus provide a worm wheel. The worm wheel can be driven by a suitable worm on the shaft of a motor 45. This type of pull-rod is fully described in my prior Patent #1,260,145, patented March 19, 1918, and reference is made to this prior patent for a more complete disclosure of the pull-rod. I wish it to be understood, however, that any suitable means other than that specifically described may be used for operation of the pull-rod.

The motor 45 may be controlled by a controller 48, shown as positioned adjacent the operator's seat. This controller 48 may be merely a reversing switch for the motor 45, so that the motor 45 may be operated in either direction, and the coupling 31 raised or lowered accordingly.

The trailer with which I have shown my device as co-operating, comprises a body B having a pair of wheels C thereon, and having at its forward portion a bracket 60. The bracket may have a protuberance 61 at its lower end, to afford a bearing when the trailer is uncoupled. The bracket 60 is shown as provided with a hollow projection 63, which is adapted to receive the projection 33 of the coupling member. The construction of these coupling members 33 and 63 is such that the trailer may have lateral movement with respect to the truck in turning corners, and as the projection 33 has rather a loose fit with the cavity 63, some up and down movement is allowed the trailer. The position of the coupling member 63 on the trailer is likewise such, as to be conveniently observed from the operator's position on the truck, when the truck is being maneuvered into coupling relation with the trailer.

The trailer is shown as provided with a geared rail R to hold the article being transported (shown as a water tank T) from becoming displaced.

The bumper 30, as will be seen in Fig. 1, prevents the parts from becoming uncoupled when in service position. In operation, to couple the members, the operator maneuvers the truck to bring the projection 33 beneath the socket in the bracket 60. This being done, the switch 48 is thrown to cause the motor 45 to operate the pull-rod, and in turn the toggle, to raise the coupling 31. The coupling enters the socket and the end of the projection 33 bears upon the inner end of the socket, raising the bracket and bringing the protuberance 61 above the floor. When the coupling is sufficiently lifted, the motor 45 is stopped and the coupling locked in operative position. This locking is due to the construction of the worm drive described in my aforementioned patent. After being coupled the operator may pull the trailer to any desired position, after which a reversal of the switch 48 allows the parts to be uncoupled. It will thus be apparent that by providing an arrangement, whereby the operator's support upon the truck, the control mechanism for maneuvering the truck, the coupling mechanism, the control means for the coupling mechanism, and the coupling member on the trailer are grouped in such relation that the operator of the truck may at all times remain in driving position on the truck, I greatly increase the efficient use thereof. Briefly, the operator is in such position on the truck that full vision is available for either driving, maneuvering, coupling or uncoupling.

Having thus described my invention, I claim:

1. The combination of a truck and a trailer, the truck having a pivotally mounted lifting member thereon, a coupling pin actuated by said lifting member, the trailer having a coupling element provided with a downwardly facing cup adapted to fit over the pin, whereby the top of the pin may engage the top of the cup to lift and the side of the pin may engage the side of the cup to pull the trailer while allowing it to turn on the coupling pin as a center.

2. An industrial truck, comprising a self-propelled vehicle, means to control and steer the vehicle, a pivoted coupling member on said truck, a motor, mechanism operated thereby to raise the coupling member, and an abutment above the coupling member adapted to coact therewith.

3. In combination, a truck, a horizontally pivoted coupling member on said truck, power multiplying means for raising the coupling member, a bumper on the truck above the coupling member, a trailer, a coupling rigid with the trailer, interengaging means on said couplings, said bumper cooperating with the raised coupling member on the truck to retain the coupling members engaged.

4. The combination of a truck having an operator's support disposed at one end of the truck whereby the operator faces laterally of the truck, a power-operated coupling member thereon having a vertical coupling projection visible from the operator's position on the truck, control means adjacent the operator's support for operating and steering the truck, and additional control means adjacent the operator's position for controlling the movement of the coupling member whereby the truck may be maneuvered by said operating and steering means and the coupling mechanism may be manipulated by the operator without necessitating his leaving the operating position on the truck.

5. The combination with an electric truck having an operator's support disposed at one end thereof in such manner that the operator faces laterally of the truck, and a trailer, the truck having a pivotally mounted power-operated coupling element comprising a lifting member attached to the truck adjacent the driver's support and in such position as to be visible from the operator's position, a coupling pin actuated by the lifting member, a recessed coupling element on the trailer for receiving said pin attached to the trailer in such manner as to be visible from the operator's position on the truck when the truck is being maneuvered by the operator into coupling relation with the trailer.

6. The combination of a truck having an operator's seat facing laterally and disposed at one end of the truck, and a trailer, the truck having power-operated trailer coupling means attached thereto adjacent the operator's position, power-operated means for maneuvering the truck into coupling relation with the trailer, control means for the truck and for the coupling means positioned adjacent the operator's seat in such manner that the operator may observe the movement of both ends of the truck and the coupling means from said seat while remaining in driving position on the truck.

7. The combination of a truck having a driver's support located at one end thereof, and a trailer, the truck having a vertical shiftable coupling member attached to the truck adjacent said support, whereby said member is observable by the operator when in driving position on said support, a coupling element secured to the trailer adapted to coact with the coupling member on the truck, motor-operated mechanism for maneuvering the truck whereby said members may be brought into coacting relation, a second motor-operated mechanism for shifting said first named coupling member into coacting relation with the coupling element on the trailer, and control means for each of said motor-operated means disposed adjacent said operator's support.

8. In an industrial truck having self-propelling means, the combination of an operator's support, a trailer, a lifting member attached to the truck adjacent the support and visible therefrom, a coupling element associated with the lifting member whereby a load may be elevated and coupled in drawbar relation to the truck frame, and power means operable from the operator's support for actuating said lifting member while being observed by the operator from his position on the truck.

9. In combination, a self-propelled truck having an operator's support adjacent one end thereof, a load lifting member attached to the truck adjacent said operator's support and having associated coupling means, a trailer, means on the trailer to normally support the end thereof when not engaged by said load lifting member, means extending from said end of the trailer for engaging the coupling means on the truck, said means being so positioned on the trailer as to be observable from the operator's platform on the truck, said coupling means including a pin adapted to coact with the trailer engaging means whereby the trailer may be pivoted with the pin as a center.

In testimony whereof, I hereunto affix my signature.

CLYDE E. COCHRAN.